(12) United States Patent
Goss et al.

(10) Patent No.: US 6,396,503 B1
(45) Date of Patent: May 28, 2002

(54) DYNAMIC TEXTURE LOADING BASED ON TEXTURE TILE VISIBILITY

(75) Inventors: Michael E. Goss, Mountain View, CA (US); Kei Yuasa, Bristol (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/476,049

(22) Filed: Dec. 31, 1999

(51) Int. Cl.[7] ............................................. G06T 11/40
(52) U.S. Cl. ....................... 345/582; 345/422; 345/428; 345/552
(58) Field of Search ................................. 345/582, 552, 345/614, 428, 422, 430, 419

(56) References Cited

U.S. PATENT DOCUMENTS 6,184,888 B1 * 2/2001 Yuasa et al. ................. 345/419
6,288,730 B1 * 9/2001 Duluk, Jr. et al. .......... 345/552
6,292,194 B1 * 9/2001 Powell, III .................. 345/430
6,304,268 B1 * 10/2001 Lourcha et al. ............. 345/428

* cited by examiner

Primary Examiner—Jeffery Brier
Assistant Examiner—Faranak Fouladi

(57) ABSTRACT

A server stores a first multi-resolution texture pyramid and a 3-D geometry object. A client downloads the geometry object and a low resolution texture tile of the first multi-resolution texture pyramid, synthesizes a second multi-resolution texture pyramid from the low resolution tile, and begins rendering images while using the second pyramid as texture. The client downloads additional, higher resolution tiles and replaces synthesized tiles in the second pyramid with the downloaded tiles. The higher resolution tiles are downloaded according to visibility in the images being rendered. Higher visibility tiles are downloaded before lower visibility tiles. The downloading of the tiles from the server is performed in parallel with the rendering of the images. Thus, real texture in the image sequence is progressively increased as synthesized tiles in the local pyramid are selectively replaced with corresponding tiles that have been fetched from the server.

22 Claims, 6 Drawing Sheets

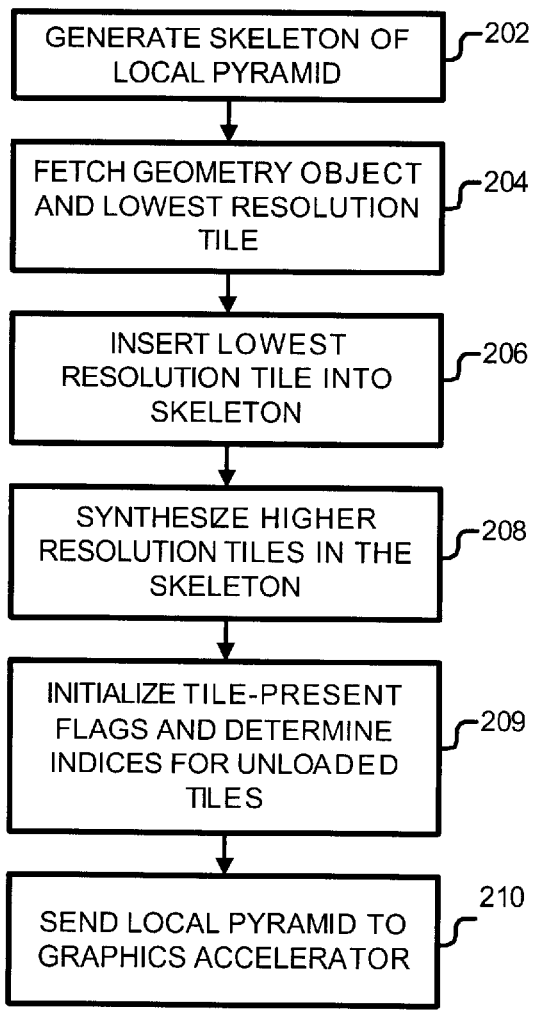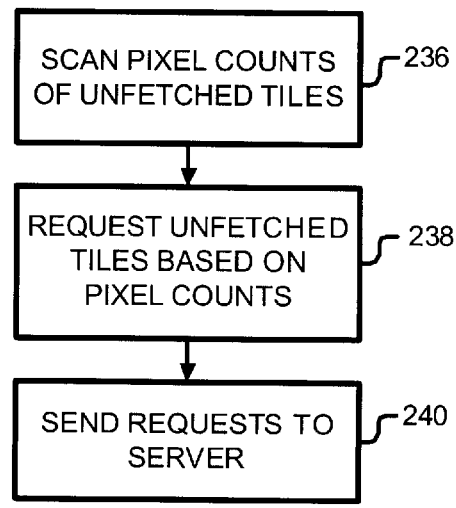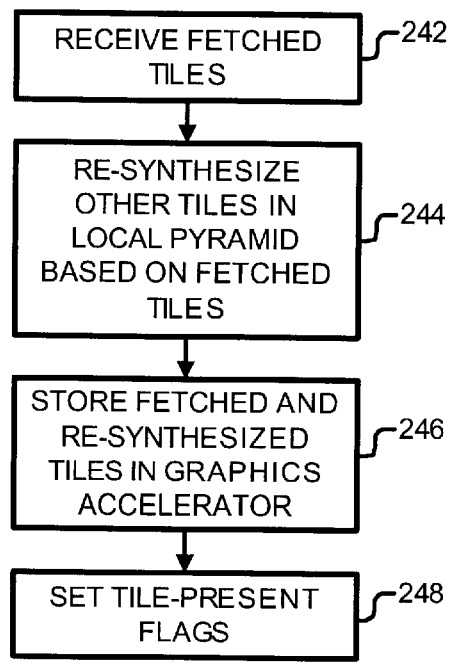

DYNAMIC TEXTURE LOADING BASED ON TEXTURE TILE VISIBILITY

BACKGROUND OF THE INVENTION

The present invention relates to computer graphics. More specifically, the present invention relates to the use of multi-resolution texture pyramids for rendering images.

Three-dimensional scenes have become an important form of content that is deliverable through the Internet. Standard formats such as Virtual Reality Modeling Language ("VRML") make it possible to dynamically download complex scenes from a server directly to a web browser.

A scene may be rendered by downloading 3-D geometry objects from a server, forming a camera model from the geometry objects, and projecting the objects into the scene. The projections are filled in with pixels, and the pixels are shaded.

For greater realism the pixels may also be textured. A texture may be any form of discrete image (e.g., a scanned photograph). The texture adds detail to surfaces of the geometric objects without an increase in actual geometric data size or complexity. For example, a device-independent bitmap representing wood grain may be mapped onto the faces of a cube to make the cube look like a wooden box. The most commonly used form of texture map is a multiple resolution image pyramid or "MIP map," which stores the texture in multiple levels of resolution.

The multi-level resolution pyramid allows different resolutions of objects in the scene to be downloaded. For example, if an object such as a cube is being viewed from a distance, it would appear small in a scene. Therefore, downloading the full resolution images of the faces of the cube would provide unnecessary detail. Instead, lower resolution images of the faces are downloaded as texture.

In a complex scene with many texture maps, the texture may represent a substantial percentage of the data that is downloaded, often exceeding the size of the object data. In some cases, such as VRML scenes used to display panoramas, the object data is almost incidental.

Limited bandwidth between server and client presents an obstacle to the availability of more complex scenes, since geometry and texture maps for a reasonably complex scene may take a relatively long time to transfer over a typical telephone modem link. The limited bandwidth can cause a bottleneck in the rendering of the scenes. Of course, the severity of the bottleneck will depend in part upon the amount of texture that is transmitted, the type of network and the speed of the network connections.

Faster network connections will not necessarily overcome the bandwidth problem. Even as connection speeds become faster, there will still be a desire to transmit even more texture and render even more complex, realistic images.

Therefore, it is an objective of the present invention to reduce the bandwidth requirements for the transmission of texture.

SUMMARY OF THE INVENTION

Bandwidth requirements are reduced by the present invention. According to one aspect of the present invention, a low resolution tile of a first multi-resolution texture pyramid is fetched from a remote site, a local multi-resolution texture pyramid is initially synthesized from the fetched low resolution tile, and a sequence of images are rendered while using the local pyramid to provide texture. The local pyramid is updated while the sequence of images is being rendered. The local pyramid is updated by fetching at least some higher resolution tiles of the first pyramid from the remote site and by replacing synthesized tiles in the local pyramid with corresponding tiles that have been fetched. The higher resolution tiles are fetched according to visibility in the scenes being rendered. The tiles having a higher visibility are fetched before the tiles having a lower visibility.

The fetching of the higher resolution tiles from the remote site is performed in parallel with the rendering of the image sequence. Thus, real texture in the image sequence is progressively increased as synthesized tiles in the local pyramid are selectively replaced with corresponding tiles that have been fetched from the remote site.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIGS. 5a, 5b, 5c and 5d are illustrations of a method of rendering an image in accordance with the present invention;

DETAILED DESCRIPTION OF THE PREFERRED EMBODIMENT

Figure 1:
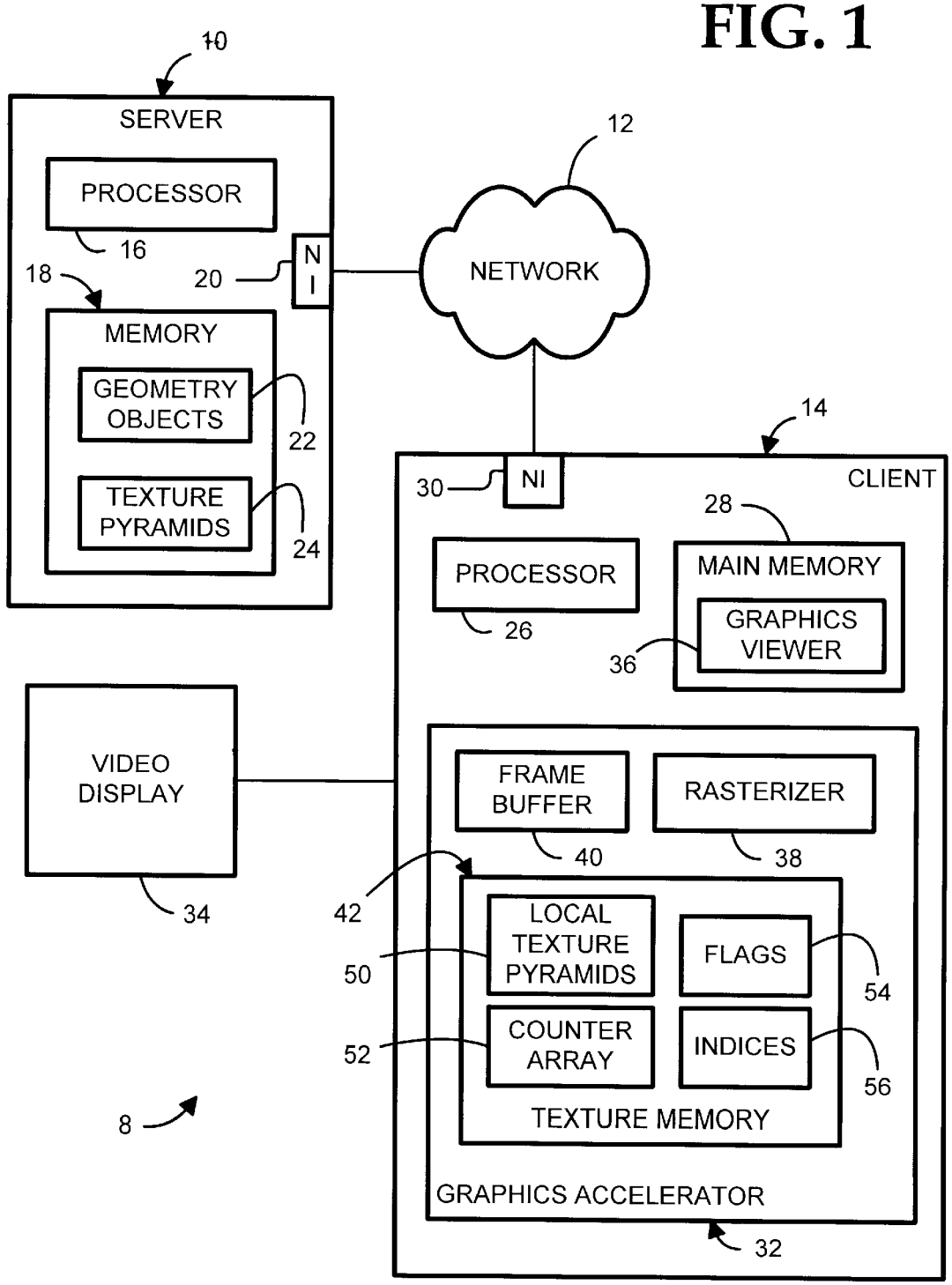
FIG. 1 is an illustration of a client-server system.

As shown in the drawings for purposes of illustration, the invention is embodied in a computer that runs web browser software. The computer can download one or more 3-D geometry objects and one or more multi-resolution texture pyramids from a server. The computer does not download the entire texture prior to rendering scenes. Instead, the computer downloads a single low resolution tile from each pyramid, synthesizes local pyramids from the downloaded tiles, and uses the local pyramids to provide texture in the rendered scenes. While the scenes are being rendered, additional, higher resolution tiles are downloaded and inserted into the local pyramids. Thus, real texture in the rendered scenes is progressively increased as synthesized tiles in the local pyramid are selectively replaced with corresponding tiles that have been downloaded. The additional higher resolution tiles are downloaded according to visibility in the scenes being rendered. Tiles having a higher visibility are downloaded before tiles having a lower visibility. Such progressive downloading of texture reduces transmission bandwidth and rendering bottlenecks. Moreover, rendering speed is increased because a client can render images while tiles are being loaded. Reduced bandwidth and increased speed are especially valuable for slow network connections. In the alternative, the same bandwidth may be maintained, but larger texture files having higher image quality may be downloaded and displayed. Consequently, higher quality scenes may be rendered.

Reference is made to FIG. 1, which shows a client-server system 8 including a server 10 connected to a network 12. The network 12 may be anything from a local area network to the Internet. In the description that follows, however, the network 12 will be described as the Internet. Any number of clients can connect to the server 10 via the network 12. The clients may be of different types (e.g., personal computers, work stations, Java appliances, Personal Digital Assistants). FIG. 1 happens to show only a single client 14 in order to simplify the explanation of the invention. Moreover, the client 14 is a personal computer.

The server 10 includes a processor 16, memory 18 and a network interface 20. Stored in the server memory 18 is a database of 3-D geometry objects 22. Each surface of an object may be approximated by a potentially large number of triangles, polygons or other surfaces. The surfaces in turn are defined by their associated properties. For example, triangles are defined by their vertices.

Also stored in the server memory 18 is texture for the objects 22. The texture is stored in the form of multi-resolution texture pyramids 24 or MIP maps. At the lowest level of each pyramid is a full resolution image. At the next higher level of a pyramid is the image at a lower resolution image (for instance, 2×2 pixels or texels in the lowest level are averaged to form a single texel in the next highest level). At the next higher level is the image at an even lower resolution. Moving towards the top of the pyramid, the resolution of the image becomes progressively lower. The highest level of the pyramid has the lowest resolution. Much less data is needed to represent the lowest resolution image than the highest resolution image.

Each level of the pyramid is broken up into tiles. For example, the highest level may be broken up into 2×2 square-shaped tiles, the next level may be broken up into 4×4 tiles, and so on. There might be 32×32 pixels per tile. Thus, each tile represents a portion of the image. Each tile is stored according to a common format such as "FlashPix."

The server 10 also includes software (not shown) for responding to client requests for the objects 22 and texture tiles. For example, the server 10 can send 3-D geometry objects 22 and tiles to the client 14 using a standard protocol. For example, images may be sent using the Internet Imaging Protocol.

Figure 2:
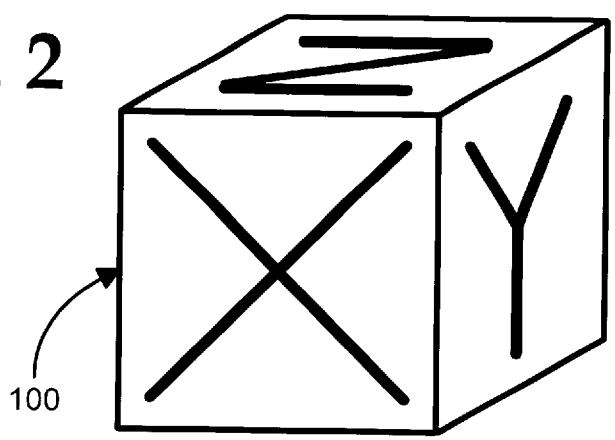
FIG. 2 is an illustration of a cube.

The objects 22 and texture pyramids 24 will now be described in connection with a simple example: a 3-D cube 100, which is shown in FIG. 2. The cube 100 has a different letter on each face (only three of which are shown). Thus, scenes of the cube 100 may be rendered from a single 3-D geometry object of the cube 100 and six texture pyramids, one for each face of the cube 100.

Figure 3:
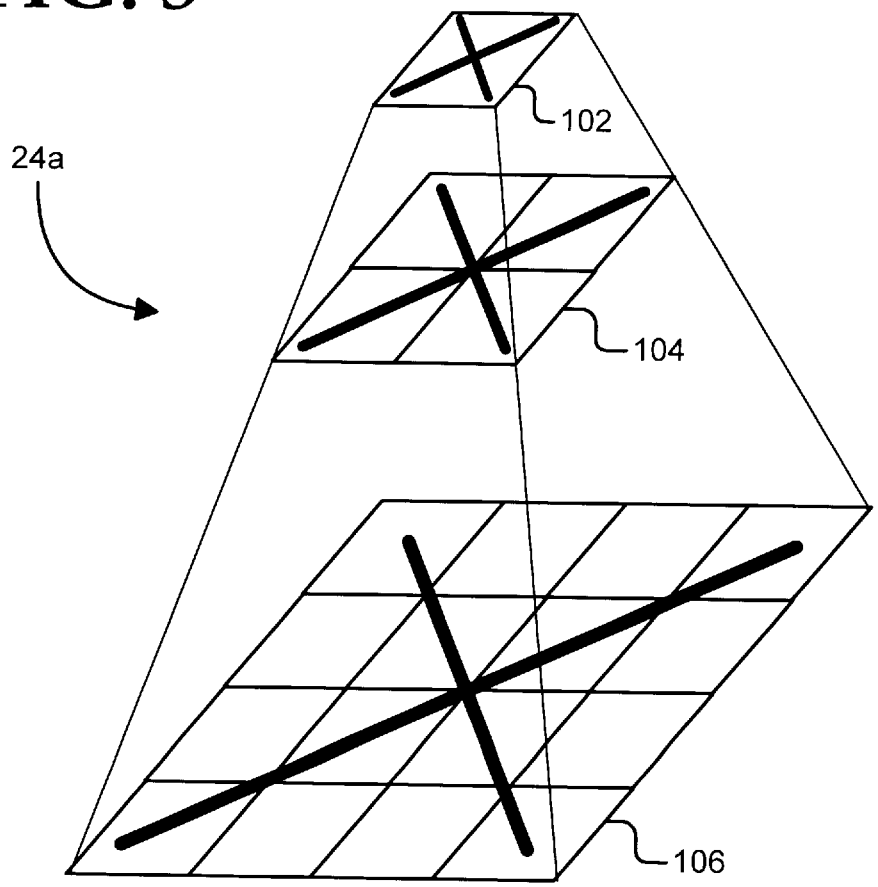
FIG. 3 is an illustration of a multi-resolution texture pyramid for a face of the cube.

A multi-level resolution texture pyramid 24a for one face of the cube 100 is shown in FIG. 3. The pyramid 24a is shown as having three levels (typically, the number of levels will be greater). At the top level is a single tile 102, which contains the lowest resolution image. The image at the next level consists of 2×2 tiles 104. The lowest level, which consists of 4×4 tiles 106, contains the full resolution image.

The client 14 is capable of downloading the 3-D geometry object 22 and texture pyramids 24, and displaying 3-D image scenes of the cube 100. Additionally, the client 14 can change viewpoint relative to the cube 100. Changing the viewpoint allows the client 14 to rotate the cube 100 about its three orthogonal axes and change the position of the cube 100 along the three orthogonal axes. For example, the client 14 may view only the cube face showing the letter X and then rotate the cube 100 to expose the faces showing the letters Y and Z (as shown in FIG. 2). The client 14 may then move the cube 100 along an axis to make the cube 100 appear larger or smaller.

The client 14 does not download the entire texture of each face prior to rendering a first scene of the cube 100. Instead, the client 14 downloads only a single low resolution tile of each texture pyramid 24, synthesizes local pyramids from the downloaded tiles, and uses the local pyramids to provide texture in the rendered scenes. While the scenes are being rendered, additional, higher resolution tiles are selectively downloaded and inserted into the local pyramids. Thus, real texture in the scenes is progressively increased as synthesized tiles in the local pyramid are selectively replaced with corresponding tiles that have been downloaded. The additional higher resolution tiles are downloaded according to visibility in the scenes being rendered. Tiles having a higher visibility are downloaded before the tiles having a lower visibility. Thus, if only one face of the cube 100 is being viewed, additional texture tiles for only that one visible face would be downloaded and used to replace the synthesized tiles. If the viewpoint is moved closer to the one face (whereby the one face appears larger), additional higher resolution texture tiles for that one face would then be downloaded. If the cube 100 is rotated to expose two additional faces, additional texture tiles for those two additional faces would be downloaded. If a face becomes occluded partially or fully by another object closer to the viewpoint, then higher resolution texture tiles for that occluded face would not be downloaded.

The client 14 includes a processor 26, main memory 28, a network interface 30, a graphics accelerator 32 and a video monitor 34. Stored in the main memory 28 is a web browser 36 having VRML or other graphics viewer capability. The graphics accelerator 32 includes a Z-buffer rasterizer 38 and a frame buffer 40. The frame buffer 40 stores the rendered scene before the scene is sent to the video monitor 34. The graphics accelerator 32 also includes texture memory 42 (e.g., random access memory) for storing the local pyramids 50, a reference counter array 52, and tile-present flags 54 (in an alternative embodiment, the reference counter array may be stored in a first set of registers and the bit-present flags may be stored in a second set of registers). The reference counter array 52 contains a pixel count for each unloaded (i.e., yet-to-be-fetched) texture tile. Each pixel count indicates the number of pixels that would be colored or textured by a corresponding higher resolution tile in a scene being rendered. The tile-present flags 54 indicate whether or not the tiles have been fetched.

Figure 4:
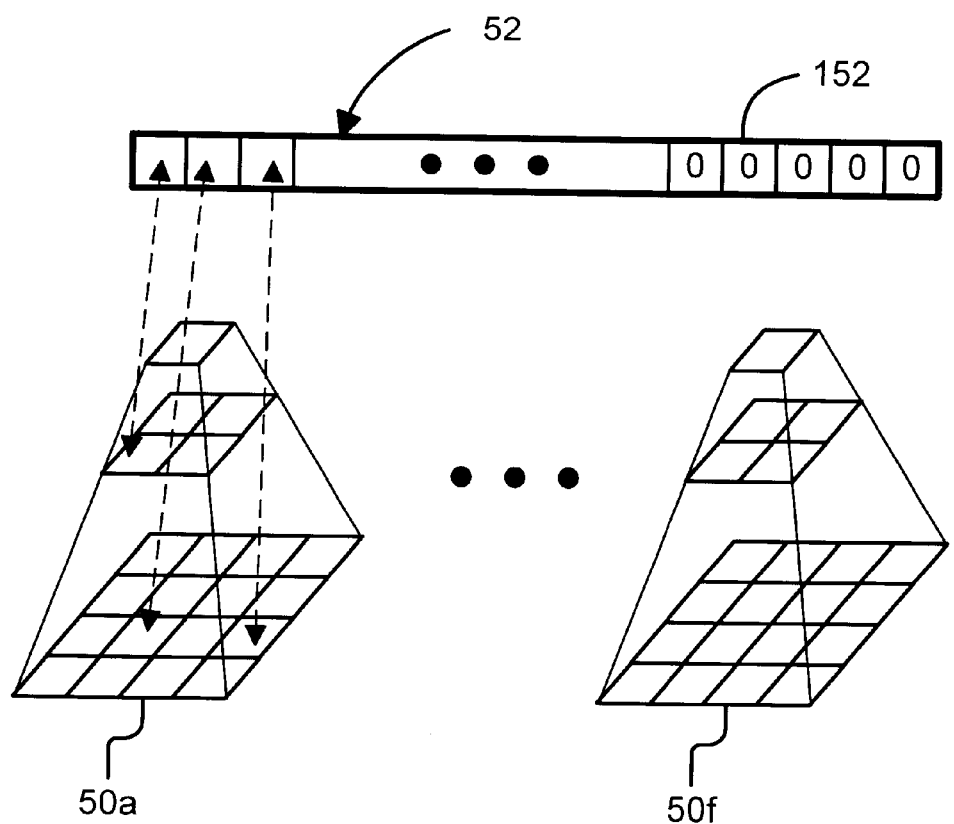
FIG. 4 is an illustration of first and last multi-resolution texture pyramids and a reference counter array for the pyramids.

FIG. 4 shows the reference counter array 52 and its relation to the six synthesized local pyramids 50a to 50f of the cube 100. The reference counter array 52 includes a counter 152 for each unloaded tile in each local pyramid 50a to 50f. Each counter 152 accumulates a count of a number of visible pixels that is colored by its corresponding unloaded tile in a scene being rendered. For example, the first local pyramid 50a provides texture for a fully visible face of the cube 100, while the last local pyramid 50f provides texture for a fully hidden face of the cube 100. Counters 152 for unloaded tiles of the first local pyramid 50a would have non-zero values, whereas counters 152 for unloaded tiles in the last local pyramid 50f would have zero values.

As more tiles are loaded, the number of counters 152 needed in the array 52 is reduced. Thus, size of the reference counter array 52 can be dynamically reconfigured as additional tiles are downloaded. The amount of memory 42 reserved for the reference counter array 52 will depend upon the actual number of local pyramids 50 and screen resolution of the video monitor 34. A typical counter length might be 10 to 22 bits, depending upon screen resolution. The actual number of local pyramids 50 will be determined by the application program, subject to the texture memory 42 on the graphics accelerator 32 and acceptable performance impact of texture paging on newer systems.

To download and display the cube 100, the client 14 runs the graphics viewer 36 and gains access to the site storing the geometry object 22 and the texture pyramids 24 for the cube 100. The download and display of a single face of the cube 100 will now be described in connection with FIGS. 5a to 5d. Since only a single face is visible, only the download and display of a single object and a single pyramid 24a (hereinafter, the "remote" pyramid 24a) will be described.

Referring to FIG. 5a, the client processor 26 determines the number of tiles in the remote pyramid 24a, generates a skeleton of the remote pyramid 24a and stores the skeleton in the client memory 28 (block 202). The skeleton contains storage for all of the tiles forming the remote pyramid 24a.

The client processor 26 downloads the object 22 and the lowest resolution tile of the remote pyramid 24a from the server 10 (block 204). The client processor 26 inserts the downloaded tile into the top level of the skeleton (block 206), synthesizes all of the higher resolution tiles from the downloaded tile and inserts the synthesized tiles into the skeleton (block 208), thereby forming a local pyramid 50a. Pixel replication may be used to synthesize the higher resolution tiles from the lowest resolution tile.

The client processor 26 initializes the tile-present flags 54 in texture memory 42 to indicate that only the lowest resolution tile was downloaded and inserted into the skeleton (block 209). The client processor 26 also assigns indices 56 to those pyramid tiles that are synthesized (block 209). The indices 56 may also be stored in texture memory 42, along with tile-present flags 54. The client processor 26 stores the local pyramid 50a in the texture memory 42 of the graphics accelerator 32 (block 210).

Figure 5B:
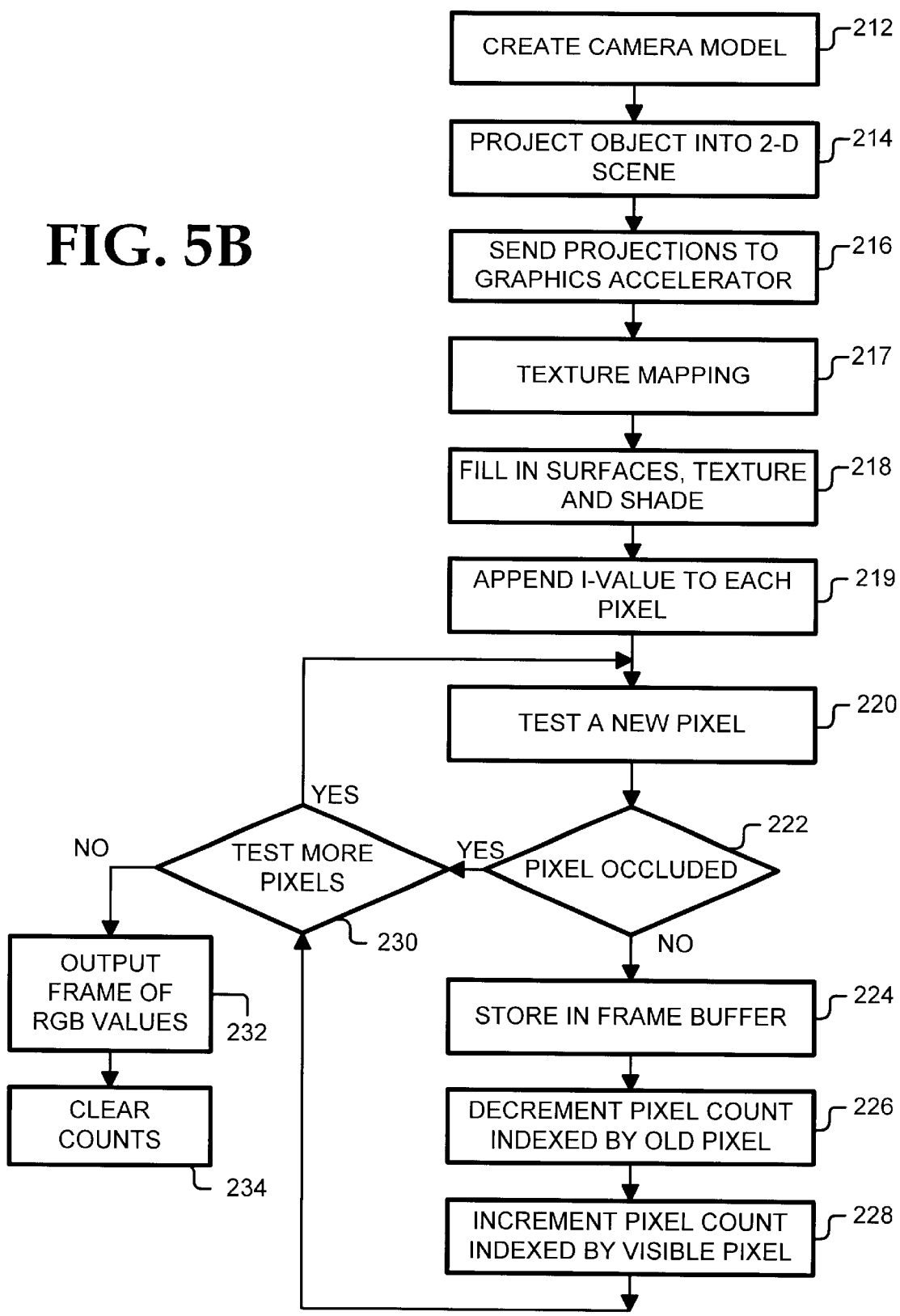

Reference is now made to FIG. 5b. The client processor 26 generates a camera model to view the downloaded object 22 (block 212). The client processor 26 then performs a viewing transformation, in which the downloaded object 22 is projected into a two-dimensional scene (block 214). The downloaded object 22 is projected according to viewing specifications, which include a viewpoint. The viewing transformation yields a collection of primitives such as triangles in pixel coordinates. The primitives are sent to the graphics accelerator 32 (block 216). In an alternative system, the graphics accelerator may perform the projection.

At the beginning of each frame, prior to rasterization, the rasterizer 38 of the graphics accelerator 32 maps the texture onto the object (block 217). A texture is mapped on the surface of an object by assigning texture coordinates to the vertices of the primitives. To determine the location of the pixel projection on the texture, the texture coordinates given at the vertices may be interpolated at the pixel center. To avoid resampling artifacts (i.e., aliasing), a filter operation may be performed for each pixel according to the size and shape of its projection on the texture. Texture tiles are selected. Resolution of each tile is usually selected according to the size of the projection. Higher resolution tiles are usually selected for larger projections, whereas lower resolution tiles are usually selected for smaller projections.

The rasterizer 38 fills in the primitives with pixels and performs shading and texturing (block 218). To perform shading the color of the primitives may be computed prior to rasterization in accordance with location and physical behavior of the light sources in the scene. To determine an individual pixel color, the values at the vertices of a triangle, for example, may then be interpolated at the pixel location.

The rasterization, shading and texturing yields pixels having the standard RGB-Z values. The RGB-value represents the red, green and blue components of a pixel. The Z-value represents the distance of pixel surface from the viewpoint.

Figure 6:
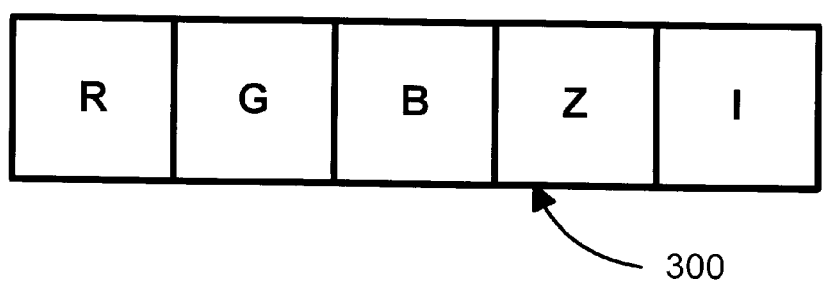
FIG. 6 is an illustration of a pixel generated by a graphics accelerator.

The rasterizer 38 also appends an I-value to the end of each pixel (block 219). The resulting pixel 300 is shown in FIG. 6. The I-value indicates whether the tile that was used to texture a pixel is synthesized or real (that is, downloaded from the server 10). If the texture tile is synthesized, the I-value points to the synthesized texture tile in the local pyramid 50a. For example, the I-value can point to the synthesized texture tile by tile number, memory address, etc. Tile numbers, for example, may be assigned by the client processor 26.

To determine the I-value, the rasterizer 38 examines the tile-present flag 54 and determines whether the tile was downloaded or synthesized. Stored along with the tile-present flag 54 is an index 56 or I-value for the tile. This flag 54 and index value 56 were previously set (see block 209). An I-value of zero might indicate that the pixel was textured with a tile that had already been loaded or that no texture was assigned, whereas a value of '20' might indicate that the pixel was textured with the $20^{th}$ unloaded tile in the local pyramid 50a.

The rasterizer 38 performs a Z-test on each pixel that is generated (block 220). The Z-test indicates whether a pixel being tested is occluded by a pixel already stored at the same spatial coordinates in the frame buffer 40. The Z-test is based on the relative Z-values of the pixel under test and the pixel already in the frame buffer 40. If the pixel under test is occluded (block 222), it is discarded and another pixel is tested (blocks 230 and 220).

If the pixel under test is not occluded (block 222), its RGB-, Z- and I-values replace those of the pixel already stored in the frame buffer 40 (block 224). The rasterizer 38 decrements the array count 152 pointed to by the I-value of the pixel being replaced in the frame buffer 40 (block 226). Thus, the tile coloring this old pixel now affects one less pixel. The rasterizer 38 also increments the pixel count 152 for the tile referenced by the I-value of the unoccluded pixel (block 228). Thus, this tile now affects one more pixel. Then, another pixel is tested (block 230).

After all of the pixels have been tested (block 230), RGB-values of the frame buffer 40 are sent to the video monitor 34 (block 232). Thus, a frame of RGB-values is displayed on the video monitor 34.

At the end of the frame (to prepare for the start of the next frame), the counters 152 in the reference counter array 52 are set to zero (block 234). The counters 152 may be initialized in parallel with an initial Z-buffer clear.

The steps indicated by block 212 to 234 are performed for each frame. In this manner, the local pyramid 52a provides texture for the rendered scenes of the visible face of the cube 100.

Reference is now made to FIG. 5c. At the end of each frame, the client processor 26 scans the pixel counts 152 in the reference counter array 52 (block 236) and selects the tiles that should be fetched (block 238). The client processor 26 may use any criteria for determining the order in which tiles should be fetched. For example, tiles having the larger counter values might be fetched before tiles having smaller counter values. The client 14 then requests the server 10 to send the selected tiles (block 240).

While the tiles are being fetched, additional scenes are being rendered. Rendering occurs at interactive speed. However, tile updating is usually slower. One or more frames may be rendered before the local pyramid 50a is updated.

Reference is now made to FIG. 5d. When the client 14 receives a tile from the server 10 (block 242), the client processor 26 re-synthesizes other tiles in the local pyramid 50a (block 244), stores the fetched and re-synthesized tiles in local memory 42 (block 246), and sets the corresponding tile-present flag(s) 54 in the texture memory 42 (block 248). Thus, the client processor 26 updates the synthesized tiles in the local pyramid 50a with real tile information As additional tiles are fetched, real texture in the rendered scenes is progressively increased because synthesized tiles of the local pyramid 52a are selectively replaced with corresponding tiles that have been fetched from the server 10.

Figure 7:
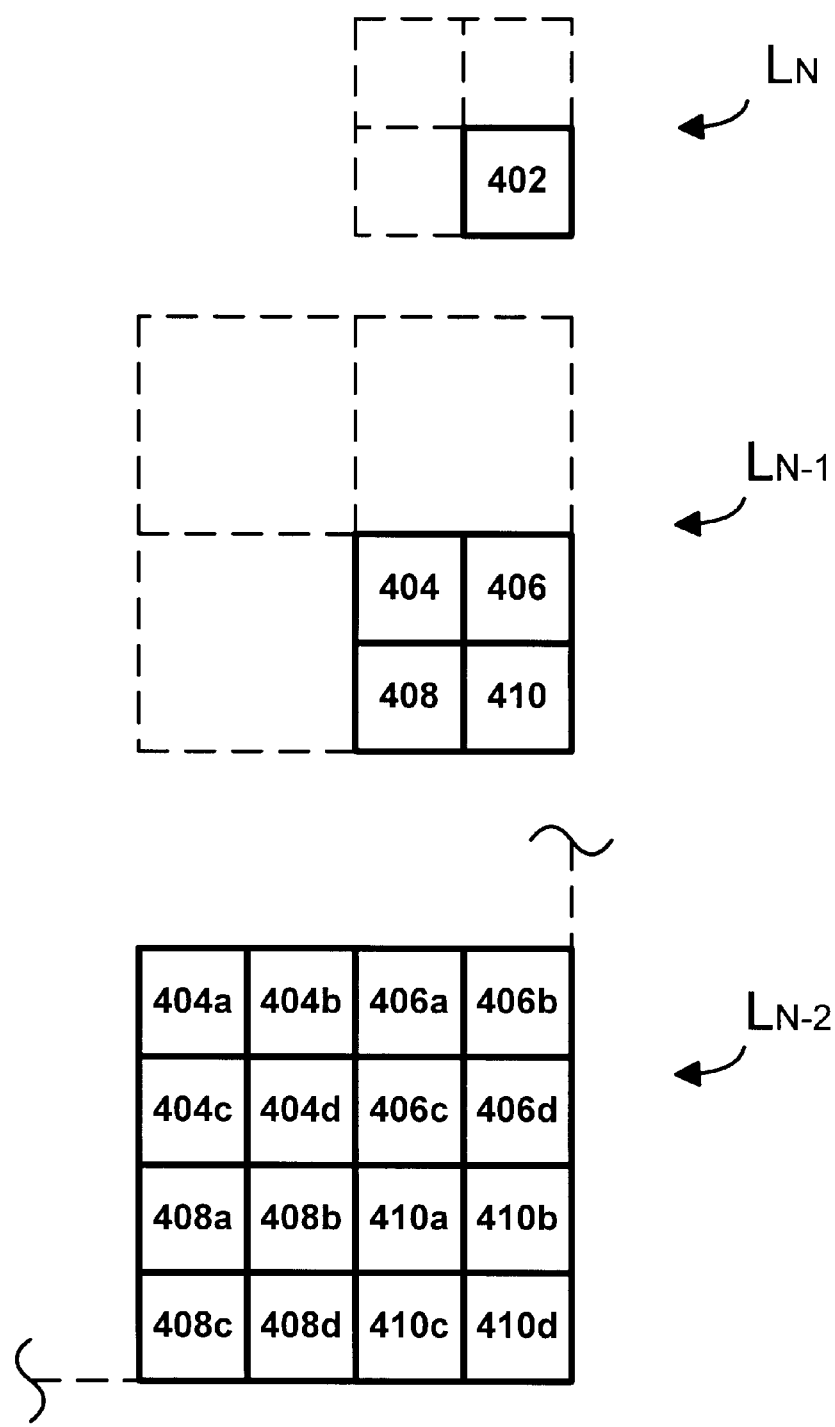
FIG. 7 is an illustration of synthesized tiles in a local pyramid.

Reference is now made to FIG. 7, which illustrates two ways in which the higher resolution tiles may be resynthesized. An unloaded parent tile is resynthesized if all of its children texture tiles have been fetched and loaded into the local pyramid. The client processor 26 uses the same interpolation technique (e.g., bi-linear interpolation, tri-linear interpolation) that was used to generate the parent tile from the children tile in the pyramid on the server 10. Since the synthesized parent tile of the local pyramid is identical to the corresponding tile on the server, there is no need to replace it later with a downloaded tile. Therefore, the tile-present flag for the resynthesized parent tile is set to true. Consequently, the resynthesized parent tile will not be replaced later by a downloaded tile.

For example, a parent tile 402 at a given resolution level $L_N$ is synthesized from the downloaded children tiles 404 to 410 of the next lower level $L_{N-1}$. The tile-present flag of the resynthesized parent tile 402 is set to true.

An unloaded child tile is resynthesized from its loaded parent tile (block 210). Pixel replication may be used. Since the resynthesized children tiles are still only estimates of the corresponding tiles on the server 10, the tile-present flags of the resynthesized children tiles are not set to true. Consequently, the resynthesized children tiles may be replaced later by downloaded tiles.

For example, children tiles 404a, 404b, 404c and 404d at the next resolution level $L_{N-2}$ are resynthesized from parent tile 404, children tiles 406a, 406b, 406c and 406d are resynthesized from parent tile 406, children tiles 408a, 408b, 408c and 408d are resynthesized from parent tile 408, and children tiles 410a, 410b, 410c and 410d are resynthesized from parent tile 410. None of the tile-present flags for the resynthesized children tiles 404a to 410d are set to true.

The invention is not limited to the embodiment described above. Although, the pixel counts may be scanned at the end of each frame to determine the tiles that should be fetched, other types of tile management may be performed. For example, pixel counts may be accumulated over a number n of frames, where integer n>1, and the pixel counts may be scanned every n image frames to determine which additional tiles should be downloaded. Thus, pixel counts would be accumulated over several frames.

Multiple tiles might reference a pixel. In such an event, the I-value of such a pixel would reference only a single tile.

If there are more tiles than entries in the reference counter array, indices may be assigned to a first group of unfetched tiles at the beginning of a first image frame, a first group of pixel counts is accumulated over the first frame, indices are assigned to a second group of unfetched tiles at the beginning of a second frame, and a second group of pixel counts is accumulated over the second frame. Tile requests are then based on the first and second groups of pixel counts. Take an example in which the maximum tile index=3 and five tiles are referenced in the reference counter array. Tile counts for three of the tiles may be accumulated in the first frame, and tile counts for the other two tiles may be accumulated in the second frame. Tiles would be downloaded according to the tile counts across the first and second frames.

The frames may be divided into relatively small, separately rendered buckets or chunks. In such a case, the reference counters may be zeroed out at the beginning of each frame, while the index pointers are reset at the start of rendering each bucket.

The contents of the frame buffer may be sent to a location other than the video monitor. For example, the contents of the frame buffer may be stored in a file for later use by a film recorder or video recorder.

The memory for the counter array and the tile-present flags may be embedded in the rasterizer or provided on separate chips on the graphics accelerator. The graphics accelerator may include a specialized geometry processor for projecting the objects.

In contrast, the rendering function may be performed entirely in software by the client processor. The reference array counter, tile-present flags, indices and local pyramids could also be stored in client memory. The client processor could write the RGB contents of a frame directly to a frame buffer on a motherboard. Thus, the client would not need a graphics accelerator.

Although the invention has been described above in connection with VRML, it is not so limited. Another modeling language, such as Chromeffects, may be used. A viewing application other than a VRML-based viewing application may be used.

The invention is not limited to Web-based applications. The invention may also be applied to any type of collaborative 3-D software, such as collaborate computer-aided design ("CAD") and digital content creation or other applications where two or more clients download the same file from the same computer.

Network extensions for performing the rendering may be invoked by extensions to software APIs (e.g., OpenGL, Direct3d) used by the applications. Some APIs such as JAVA3D may be able to implement these rendering functions invisibly to the user.

Accordingly, the present invention is not limited to the embodiments described above. Instead, the present invention is construed according to the claims that follow.

What is claimed is:

1. Apparatus for using a first multi-resolution texture pyramid to provide texture in a sequence of rendered images, the first pyramid being stored on a remote site, the first pyramid including a low resolution tile and a plurality of higher resolution tiles, the apparatus comprising:

first means for fetching the low resolution tile from the remote site;

second means for initially synthesizing a local multi-resolution texture pyramid from the fetched low resolution tile; and third means for rendering the sequence of images while using the local pyramid to provide texture;

the second means updating the local pyramid while the sequence of images is being rendered, the second means updating the local pyramid by requesting the first means to fetch at least some of the higher resolution tiles from the remote site and by replacing synthesized tiles in the local pyramid with corresponding tiles that have been fetched, the higher resolution tiles being requested according to visibility in the images being rendered, the tiles having a higher visibility being fetched before the tiles having a lower visibility;

the fetching of the higher resolution tiles from the remote site being performed in parallel with the rendering of the image sequence;

whereby real texture in the image sequence is progressively increased as synthesized tiles in the local pyramid are selectively replaced with corresponding tiles that have been fetched from the remote site.

2. The apparatus of claim 1, wherein the low resolution tile has the lowest resolution in the first pyramid.

3. The apparatus of claim 1, wherein the second means updates the local pyramid by re-synthesizing a synthesized parent tile if all higher resolution children texture tiles have been fetched, the second means also treating a re-synthesized parent tile as fetched.

4. The apparatus of claim 1, wherein the second means updates the local pyramid by re-synthesizing a synthesized child tile if a parent tile has been fetched, the second means treating a re-synthesized child tile as unfetched, whereby a re-synthesized child tile may be fetched later from the remote site.

5. The apparatus of claim 1, wherein the third means generates pixel counts for at least some of the higher resolution tiles that have not been fetched, each pixel count indicating a number of pixels referencing a corresponding higher resolution tile in a scene being rendered; and wherein the second means determines the visibility of the higher resolution tiles that have not been fetched by scanning the pixel counts.

6. The apparatus of claim 5, wherein the second means scans the pixel counts at the end of each image frame to determine which tiles will be requested.

7. The apparatus of claim 5, wherein the pixel counts are accumulated over n image frames, where integer n>1; and wherein the second means scans the pixel counts every n image frames to determine which tiles will be requested.

8. The apparatus of claim 5, wherein the third means renders a given image by projecting a geometry object into the given image, filling in at least one projection with a set of pixels, and performing Z-tests on the pixels; and wherein the third means generates the pixel counts according to results of the Z-tests, the pixel count for a given tile being incremented if a pixel referencing the given tile passes the Z-test and replaces an old pixel, a pixel count for the tile referenced by the old pixel being decremented.

9. The apparatus of claim 8, wherein the third means generates pixels indicating color value, a Z-depth, and a tile index, the tile index referencing a pixel count.

10. The apparatus of claim 8, wherein the second means assigns indices to the unfetched tiles at the beginning of an image frame, and wherein the third means generates a tile index of a single tile, even if a pixel is colored by multiple tiles.

11. The apparatus of claim 8, wherein the second means assigns indices to a first group of unfetched tiles at the beginning of a first image frame, wherein the second means accumulates a first group of pixel counts for the first tile group over the first image frame, wherein the second means assigns indices to a second group of unfetched tiles at the beginning of a second image frame, wherein the second means accumulates a second group of pixel counts for the second tile group over the second image frame, and wherein the second means makes requests based on the first and second groups of pixel counts.

12. Apparatus comprising:
a network interface;
a processor for fetching a low resolution tile via the network interface, the processor initially synthesizing a local multi-resolution texture pyramid from the fetched low resolution tile; and
a graphics accelerator for rendering a sequence of images while using the local pyramid to provide texture;
the processor updating the local pyramid while the sequence of images is being rendered, the processor updating the local pyramid by fetching at least some of the higher resolution tiles via the network interface and by replacing synthesized tiles in the local pyramid with corresponding tiles that have been fetched, the higher resolution tiles being requested according to visibility in the images being rendered, the tiles having a higher visibility being fetched before the tiles having a lower visibility;

the fetching of the higher resolution tiles being performed in parallel with the rendering of the image sequence.

13. The apparatus of claim 12, wherein the processor updates the local pyramid by re-synthesizing a synthesized parent tile if all higher resolution children texture tiles have been fetched, the second means also treating a re-synthesized parent tile as fetched.

14. The apparatus of claim 12, wherein the processor updates the local pyramid by re-synthesizing a synthesized child tile if a parent tile has been fetched, the second means treating a re-synthesized child tile as unfetched, whereby a re-synthesized child tile may be fetched later from the remote site.

15. The apparatus of claim 12, wherein the graphics accelerator generates pixel counts for at least some of the higher resolution tiles that have not been fetched, each pixel count indicating a number of pixels referencing a corresponding higher resolution tile in an image being rendered; and wherein the processor determines the visibility of the higher resolution tiles that have not been fetched by scanning the pixel counts.

16. The apparatus of claim 15, wherein the processor scans the pixel counts at the end of each image frame to determine the tiles that will be fetched.

17. The apparatus of claim 15, wherein the pixel counts are accumulated over n image frames, where integer n>1; and wherein the processor scans the pixel counts every n image frames to determine the tiles that will be fetched.

18. The apparatus of claim 15, wherein the graphics accelerator renders a given image by projecting a geometry object into the given image, filling in at least one projection with a set of pixels, and performing Z-tests on the pixels; and wherein the graphics accelerator generates the pixel counts according to results of the Z-tests, the pixel count for a given tile being incremented if a pixel referencing the given tile passes the Z-test and replaces an old pixel, a pixel count for the tile referenced by the old pixel being decremented.

19. The apparatus of claim 18, wherein the graphics accelerator generates pixels indicating color value, a Z-depth, and a tile index, the tile index pointing to a pixel count.

20. The apparatus of claim 18, wherein the processor assigns indices to the unfetched tiles at the beginning of an image frame, and generates a tile index of a single tile, even if a pixel is textured by multiple tiles.

21. The apparatus of claim 18, wherein the processor assigns indices to a first group of unfetched tiles at the beginning of a first image frame, accumulates a first group of pixel counts for the first tile group over the first image frame, assigns indices to a second group of unfetched tiles at the beginning of a second image frame, accumulates a second group of pixel counts for the second tile group over the second image frame, and makes requests based on the first and second groups of pixel counts; whereby the requests are based on counts across at least two frames.

22. A graphics accelerator comprising:

texture memory;

a frame buffer; and a Z-buffer rasterizer for rendering a given image by projecting a geometry object into the given image, filling in at least one projection with a set of pixels, and performing Z-tests on the pixels, each pixel including a color value, a Z-depth and a tile index; and wherein the graphics accelerator generates pixel counts according to results of the Z-tests and stores the pixel counts in the texture memory, the pixel count for a given tile being incremented if a pixel referencing the given tile passes the Z-test and replaces an old pixel in the frame buffer, a pixel count for the tile referenced by the old pixel being decremented.

* * * * *